United States Patent
Syed et al.

(10) Patent No.: US 9,930,379 B2
(45) Date of Patent: Mar. 27, 2018

(54) SYSTEM AND METHOD FOR DATA STREAM FRAGMENTATION

(75) Inventors: Yasser F. Syed, La Crescenta, CA (US); Paul D. Egenhofer, Littleton, CO (US)

(73) Assignee: COMCAST CABLE COMMUNICATIONS, LLC, Philadelphia, PA (US)

(*) Notice: Subject to any disclaimer, the term of this patent is extended or adjusted under 35 U.S.C. 154(b) by 258 days.

(21) Appl. No.: 13/362,800

(22) Filed: Jan. 31, 2012

(65) Prior Publication Data

US 2013/0195203 A1     Aug. 1, 2013

(51) Int. Cl.
- G06T 7/00 (2017.01)
- H04N 21/2343 (2011.01)
- H04N 21/845 (2011.01)
- H04L 29/06 (2006.01)

(52) U.S. Cl.
CPC ..... *H04N 21/23439* (2013.01); *H04L 65/602* (2013.01); *H04L 65/80* (2013.01); *H04N 21/8456* (2013.01)

(58) Field of Classification Search
CPC .... H04N 21/23439; H04N 13/02; G06T 7/00; G06T 5/00; G06T 1/00
USPC ..... 375/240.26, 240.01, 240.08, 225; 725/31
See application file for complete search history.

(56) References Cited

U.S. PATENT DOCUMENTS

| | | | |
|---|---|---|---|
| 2003/0044054 A1* | 3/2003 | Olschewski | G02B 21/367 382/128 |
| 2003/0093810 A1* | 5/2003 | Taniguchi | G08B 13/19656 725/112 |
| 2003/0128759 A1* | 7/2003 | Prakash | G06T 9/001 375/240.08 |
| 2004/0199658 A1* | 10/2004 | Darshan et al. | 709/232 |
| 2011/0080940 A1 | 4/2011 | Bocharov et al. | |
| 2012/0013746 A1 | 1/2012 | Chen et al. | |
| 2012/0121188 A1* | 5/2012 | Kenji | H04N 19/46 382/196 |

FOREIGN PATENT DOCUMENTS

| | | |
|---|---|---|
| CA | 2803738 | 1/2013 |
| EP | 13153077.6 | 1/2013 |
| EP | 2624578 | 8/2013 |
| WO | WO-2011/038013 A2 | 3/2011 |
| WO | WO-2013/033565 A1 | 3/2013 |
| WO | WO-2013/043923 A1 | 3/2013 |

OTHER PUBLICATIONS

3GPP et al., 3rd Generation Partnership Project; Technical Specification Group Services and System Aspects; Transparent End-to-End Packet-Switched Streaming Service; Progressive Download and Dynamic Adaptive Streaming Over HTTP, 3GPP TS 26.247, vol. SA WG4(V10.0.0): 1-94 (2011).

(Continued)

*Primary Examiner* — Dave Czekaj
*Assistant Examiner* — Berteau Joisil
(74) *Attorney, Agent, or Firm* — Ballard Spahr LLP (57) ABSTRACT

A method of data conditioning is disclosed that in one aspect includes receiving a data stream and encoding into the data stream information representing a boundary of a content fragment, wherein the boundary is independent of a group of pictures structure of the data stream.

20 Claims, 6 Drawing Sheets

(56) References Cited

OTHER PUBLICATIONS

Begen, A. et al., Watching Video Over the Web: Part 1: Streaming Protocols, IEEE Internet Computing, pp. 54-63 (2011).
DVB Organization, Information Technology—Dynamic Adaptive Streaming Over HTTP (DASH)—Part 1: Media Presentation Description and Segment Formats, Digital Video Broadcasting (2012).
Stockhammer, T. et al., MPEG Dash: The Enabler Standard for Video Delivery Over the Open Internet, International Broadcasting Conference (2011).
Thang, T.C. et al., Signaling Metadata for Adaptive HTTP Streaming, MPEG Metting (2010).
European Search Report dated May 7, 2013 by the European Patent Office for European Patent Application No. 13153077.6, which was filed on Jan. 29, 2013 and published as 2624578 on Aug. 7, 2013 (Inventor—Syed et al.; Applicant—Comcast Cable communications, LLC; (9 pages).

* cited by examiner

| | | |
|---|---|---|
| ENC_bound_pt_info( ) { | | |
|   data_field_tag | 8 | uimbsf |
|   data_field_length | 8 | uimbsf |
|   If (data_field_length > 0) { | | |
|     ENC_bound_pt | 1 | bslbf |
|     ENC_bound_pt_grouping | 1 | bslbf |
|     ENC_bound_pt_time | 1 | bslbf |
|     ENC_bound_pt_reserved | 5 | "00000" |
|   } | | |
|   if (ENC_bound_pt=="1") { (TBD in future) | | |
|   } | | |
|   if (ENC_bound_pt_grouping=="1") { | | |
|     ENC_bound_pt_grouping_id | 4 | uimsbf |
|     ENC_bound_pt_grouping_start | 1 | bslbf |
|     ENC_bound_pt_grouping_end | 1 | bslbf |
|     ENC_bound_pt_grouping_reserved | 2 | "00" |
|   } | | |
|   if (ENC_bound_pt_time=="1") { | | |
|     ENC_bound_pt_time_utc | 64 | uimsbf |
|   } | | |
|   for (i=0; i<n; i++) { | | |
|     ENC_bound_pt_reserved_byte | 8 | uimsbf |
|   } | | |
| } | | |

SYSTEM AND METHOD FOR DATA STREAM FRAGMENTATION

BACKGROUND

Data streaming such as media streaming, is a technique for transferring data. With data streaming, a large set of data can be accessed sequentially without first obtaining the entire file. One application of streaming that has found wide acceptance is the streaming of audio and video files that are too large to be downloaded before they are consumed by an end user. Streaming technologies are becoming increasingly important with the growth of the Internet because sufficient bandwidth is needed to download large multimedia files quickly.

Adaptive streaming is an advanced form of streaming that aims to adjust the quality of a data stream delivered to an end-user based on changing network conditions to ensure the best possible delivery experience (e.g., viewing video, listening to audio, and the like). Adaptive streaming also aims to provide an improved streaming media experience because a delivery of the data stream is adapted based upon the changing conditions of the user's network. What is needed is an adaptive streaming technology that is more flexible and appears substantially smooth and seamless to users, so that if up-scaling or down-scaling the quality of the stream is necessary in midstream, the switch does not disrupt the playback.

SUMMARY

It is to be understood that both the following summary and the following detailed description are exemplary and explanatory only and are not restrictive, as claimed. In one aspect, provided are methods and systems for data stream fragmentation that provide a means to indicate characteristics of a content fragment represented by a data stream independent of a GOP structure, thereby maximizing a quality of a deliverable content.

In an aspect, a system for data fragmentation can comprise an encoder configured to receive a data stream and to encode into the data stream information representing a boundary of a content fragment. As an example, the boundary can be independent of a group of pictures structure of the data stream. As a further example, a fragmentor can be in signal communication with the encoder. In an aspect, the fragmentor can be configured to receive the data stream therefrom, the fragmentor further configured to construct the content fragment based upon the information representing the boundary of the content fragment.

The present disclosure also describes methods for data conditioning and/or fragmentation. In an aspect, one method can comprise the steps of receiving a data stream comprising content and encoding into the data stream information representing a boundary of a content fragment. As an example, the boundary can be independent of a group of pictures structure of the data stream.

Another method can comprise the steps of receiving a data stream representing a content fragment and encoding a boundary flag in the data stream. As an example, the boundary flag can be indicative of a boundary of the content fragment. As a further example, the boundary flag can be independent of a group of pictures structure of the data stream. In an aspect, a universal time stamp can be encoded in the data stream. As an example, the universal time stamp can be indicative of a time the boundary flag is encoded in the data stream.

Additional embodiments and advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain embodiments and principles of the methods and systems.

DETAILED DESCRIPTION

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes. In addition, this disclosure uses certain terms relating to exemplary video compression or encoding standards for convenience. For example, the terms "I-Frame" or "IDR-Frame" are often used to describe a first (or reference frame) in certain video compression technologies such as MPEG-2 or MPEG-4 (e.g., MPEG-4 Part 10-AVC/H.264). These terms are used herein for convenience, and are not intended to limit the scope of the disclosure to a particular video compression technology or format.

The systems and methods of the present disclosure can be used in adaptive or dynamic streaming and/or other processes of efficiently delivering streaming video to users by dynamically switching among different streams of varying quality and size during playback based upon the client player returning network condition information to the streaming server. This provides users with the best possible viewing experience for the bandwidth and local computer hardware (CPU) available to the user. As an example, the systems and methods can detect a user's bandwidth and CPU capacity in real time and adjusts the quality (e.g., bit rate, resolution, etc.) of the video stream accordingly. In certain applications, adaptive streaming systems include an encoder to process/condition a single source video at multiple bit rates (MBR). Accordingly, a player client receiving the MBR data stream can switch between streaming the different encodings (e.g., bit rates) depending on available resources.

To manage and deliver large data files in a streaming environment, streaming technologies that involve an adaptive data stream can divide the data stream into smaller video fragments that are, for example, a few seconds long. The fragments can then be arranged sequentially to form a video in the streaming client. The fragments can comprise varying video quality and there can be multiple fragments corresponding to a single portion of a stream, each at different levels of quality. In an aspect, adaptive streaming systems, according to the present disclosure, can adapt to network and client changes by loading successive fragments in a higher or lower quality, as needed.

In order to keep track of all available quality levels and fragments, adaptive streams can include a manifest (e.g., small text or XML file) that contains basic information of all available quality levels and fragments. Accordingly, clients can load the manifest to gather information about the fragments. Then the client can load the video fragments, generally in the best possible quality that is available at that point in time. Several conventional adaptive streaming technologies exist. For example, Microsoft provides a product known as IIS Smooth Streaming ("Smooth"), Adobe provides a product known as Flash Dynamic Streaming ("Flash"), and Apple provides HTTP Adaptive Bitrate Streaming ("Apple"). Each of the conventional adaptive streaming technologies differ with respect to, among other things, compatible platforms, media containers, supported codecs (coders/decoders), end-to-end latency, and default fragment length.

In an aspect, a fragment of a data stream can include a group of pictures (GOP) structure. A GOP can be a group of successive pictures within a coded video stream. As an example, each coded video stream includes successive GOPs, from which the visible frames are generated.

In an aspect, a GOP can begin with an IDR-picture or IDR-frame (intra coded picture), which is a reference picture representing a fixed image and is independent of other picture types. As an example, certain video compression formats, such as MPEG-2, also refer to this reference image as an I-frame. The IDR-frame can represent the first image in a video sequence, and all of the subsequent frames in the GOP can be used to change the IDR-frame to create video. In an aspect, A P-picture or P-frame (predictive coded picture) can contain motion-compensated difference information from the preceding IDR- or P-frame. A B-picture or B-frame (bi-directionally predictive coded picture) can contain difference information from the preceding and following IDR- or P-frame within a GOP. As an example, a D-picture or D-frame (DC direct coded picture) can be a type of frame that serves the fast advance for MPEG-1 compression format.

As an example, when a stream fragment is restricted to a single GOP, the quality of the ultimate stream can suffer. This is because, among other reasons, the GOP structure has a single IDR frame, but can have varied numbers of P, B, and D-frames, depending on the particular application. Where a fragment is set to a fixed length and contains a single GOP, as is the case in the current state of the art, the video quality within fragments can become inconsistent depending on the density of the data in the given fragment. For example, in order to maintain a quality level, two seconds of a high-speed action video may require more IDR-frames or P-frames than two seconds of dialog between two characters on an unchanging screen. Current adaptive streaming technologies' reliance on the GOP structure does not take these differences into account, however, and as a result, video quality can suffer. The systems can methods of the present disclosure can be independent of GOP structure. Accordingly, each fragment can comprise one or more IDR frames and the frames in the fragment can have various arrangements.

Disclosed are components that can be used to perform the described methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. The present methods and systems may also take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

As described in more detail below, a system for processing a data stream can comprise an encoder/transcoder to condition fragments of the data stream and/or encode information relating to each of the fragments for down stream processing of the fragments.

Figure 1A:
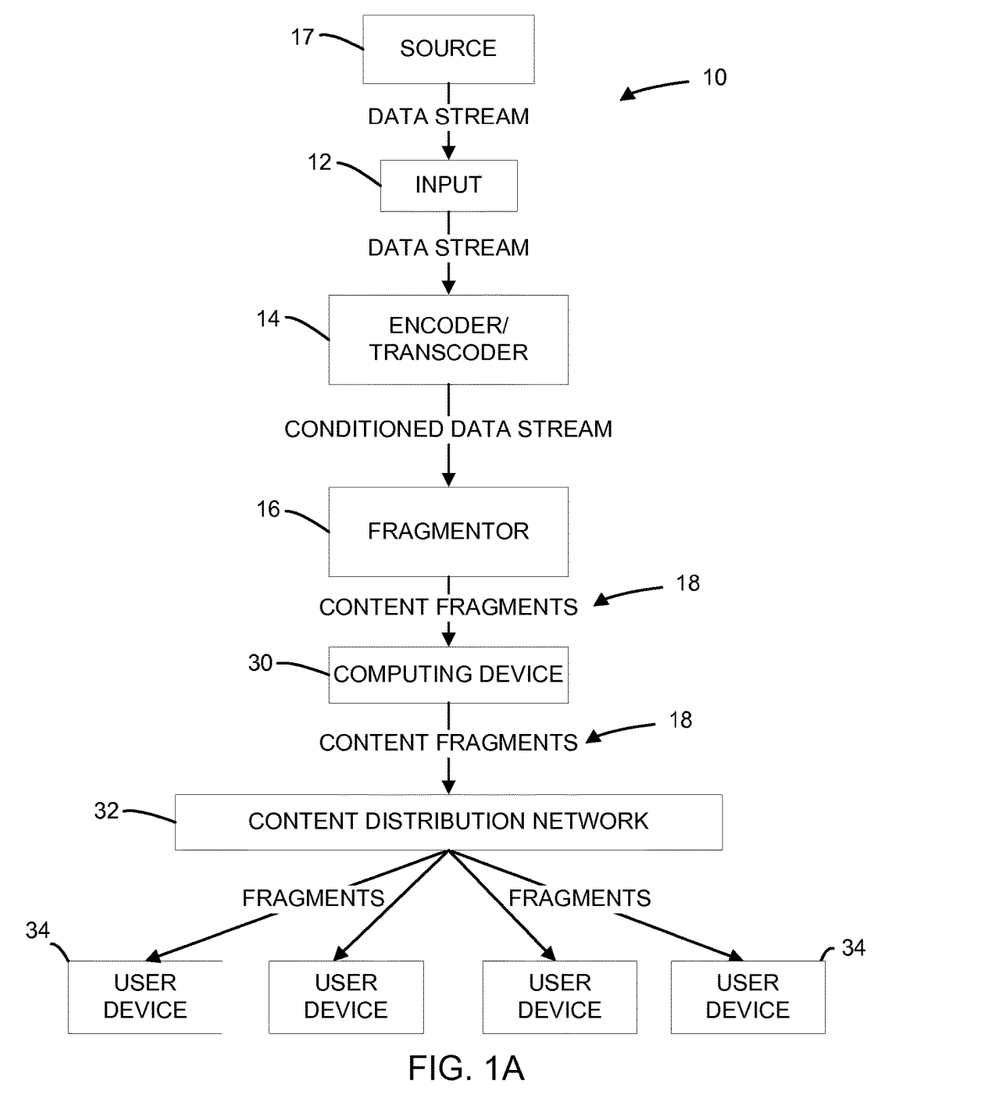
FIG. 1A is a block diagram of an exemplary data stream fragmentation network.

FIG. 1A illustrates various aspects of an exemplary network and system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

FIG. 1A is a block diagram of an exemplary data stream fragmentation network and system 10. In an aspect, the network and system 10 can comprise an input 12 for receiving a data stream, an encoder 14 in signal communication with the input 12, and a fragmentor 16 in signal communication with the encoder 14. The network and/or system 10 can include other components such as processors, routers, network devices and the like.

The input 12 can be any device, system, apparatus, or the like to provide a signal communication between a data source 17 (e.g., data feed, signal source, file, etc.) and the encoder 14 and to transmit the data stream to the encoder 14 for signal processing/conditioning. In an aspect, the data source 17 can be a content provider (e.g., data, audio content, video content, news feed, sports programming, etc.) configured to transmit the data stream to various end-users (e.g., or allow access to the data stream). As an example, the data source 17 can be a network data feed transmitting the data stream to subscribers or clients. As a further example, the data source 17 can transmit or allow access to the data stream in a standard video format, such as, but not limited to, any of the Moving Picture Experts Group standards (e.g., MPEG-2, MPEG-4, a single MPEG-4 video encapsulated in an MPEG-2 transport stream over UDP MCAST, etc.), or any of the standards for audio and/or video, such as MP3, Quicktime, and Audio Video Interleave (avi). However, the encoder 14 can receive the data stream from any source having any format that can be encoded (or transcoded) into a format that is appropriate for streaming.

The encoder 14 can be any device, system, apparatus, or the like to encode and/or transcode the data stream. In an aspect, the encoder 14 converts input video having a single bit rate (by way of example, high bit rate video), to an output video of one or more data streams of other bit rates (by way of example, lower bit rate video). In another example, the encoder 14 converts the data stream from the input format received from the data source (such as MPEG-4) to a transport format for distribution to users or consumers (such as MPEG-2). In an aspect, the encoder 14 can comprise a device such as a transcoder that conditions streaming data and/or changes data from one format to another. In an aspect, the encoder 14 can comprise a separate encoder and transcoder for conditioning streaming data and/or changing the data from one format to another. As an example, the encoder 14 can receive or access the data stream from the input 12 and encodes/transcodes information onto the data stream. As a further example, the encoder 14 can add information to the stream relating to content fragments 18.

Figure 1B:
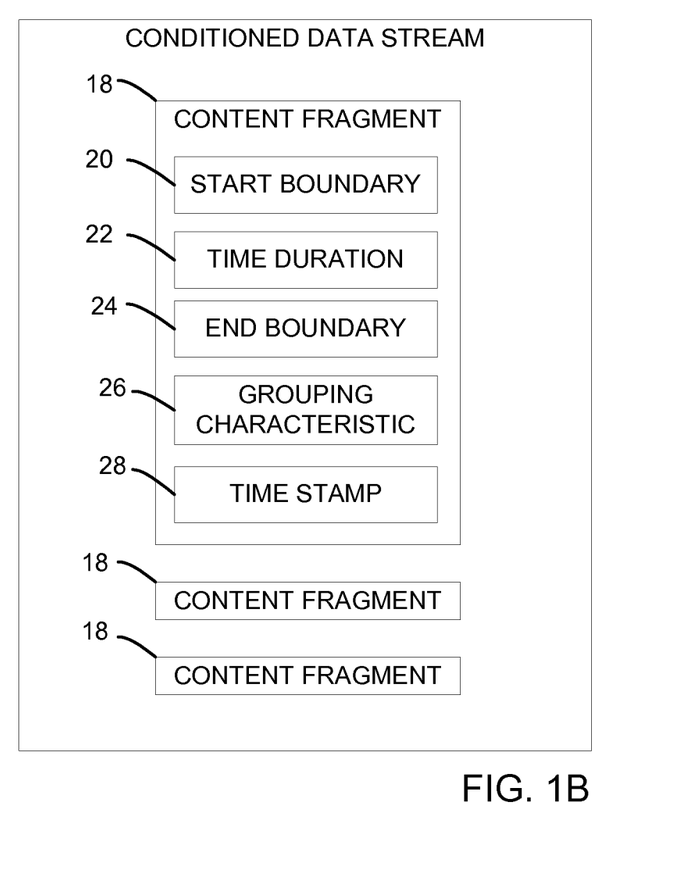
FIG. 1B is a block diagram of an exemplary data stream.

Turning now to FIG. 1B, content fragments will be discussed in greater detail. As shown in FIG. 1B, the exemplary data stream comprises content that can be divided into one or more content fragments 18. As an example, each of the content fragments 18 comprises a particular bit rate and resolution. As a further example, the data stream can be an adaptive data stream and each of the content fragments 18 can comprise variable characteristics such as bit rate and resolution.

As shown in FIG. 1B, the content fragments 18 can be defined by a start boundary 20 and a pre-defined time duration 22. In an aspect, the content fragment 18 can also include an independently defined end boundary 24. As an example, at least one of the start boundary 20 and the end boundary 24 can be an indicated point in a video format appropriate for streaming that can be assignable to a video frame independent of GOP structure. As an example, a boundary (e.g., the start boundary 20) of the content fragment 18 is not limited to an I frame. Accordingly, the content fragment 18 can be defined to include multiple I-frames. By allowing fragment boundaries that are independent of the GOP structure, a fragment of video can be created flexibly such that it includes an appropriate number of GOPs (or portions thereof) for a given scene. By way of example, a fragment containing high-speed action can include a large number of frames I or IDR, but need not be limited to a single GOP, thus allowing an appropriate amount of video information to be encoded into the fragment so as to smoothly display the scene without removing information that was present in the original data stream received from the data source 17. Additionally, the independently defined start boundary 20 allows playback of an associated one of the content fragments 18 in any frame (i.e. not just an I-frame). Furthermore, each of the content fragments 18 formed from the data stream can have different characteristics such as duration, resolution, and bit rate.

An additional problem with the conventional limitation of streaming technologies that require fragments to correspond to a single GOP structure include instances where a significant transition, such as a scene change, occurs in mid-fragment. A scene change often can be indicated with an IDR frame. Conventional streaming technologies cannot accommodate such timing for an IDR frame because a GOP cannot include an IDR frame other than in the first position, and accordingly, cannot include a fragment with an IDR frame other than in the first position. The fragmentation system 10 disclosed here, however, allows fragments to break across GOP boundaries or GOP structure to break within a fragment, thus allowing the IDR frame to exist at its intended position, regardless of the time at which the IDR frame occurs.

Returning now to FIG. 1A, an exemplary aspect of the encoder 14 will be discussed in greater detail with respect to the identification and marking of content fragments 18.

In an aspect, the encoder 14 can be configured to encode the data stream with a boundary flag indicative of at least one of the start boundary 20 and the end boundary 24 of at least one of the content fragments 18 in the data stream. As an example, the data stream can include a GOP structure including a plurality of pre-defined frames. As an example, any of the frames can be configured by the encoder 14 to define at least one of the start boundary 20 and the end boundary 24 of each of the content fragments 18. As a further example, the start boundary 20 and end boundary 24 of each of the content fragments 18 can be defined independently from the I-frame that bounds a GOP structure.

In an aspect, the encoder 14 can be configured to encode the data stream with a group flag that indicates the existence of a grouping characteristic 26 of the underlying content. By way of example, each picture of a video data stream can be encoded to identify a particular grouping or subgrouping to which the particular picture belongs. This grouping can indicate, among other things, the start and/or end boundaries of a program, television show, movie, or other logical grouping of pictures. Content associated with a group flag can belong to more than one group. In this way, the content represented by the data stream can be grouped for a desirable fragmentation and for various programming and standards.

In an aspect, the encoder 14 can insert a program boundary indicator in the data stream. The program boundary indicator can identify the fragment that represents the beginning of a given item of content, such as a particular television program. This additional information can provide additional advantages such as improved speed for indexing and accessing a given program in, for example, a video on demand application.

One exemplary use of the group flag includes support for multiple streaming technologies. Technologies presently available for data streaming have different requirements, for example, the length of the fragments. In an aspect, each fragment of the content represented by the data stream can be identified as part of a group that can be a "best fit" for a particular type of streaming technology. This allows a downstream device (such as a fragmentor 16) to process the content according to knowledge of these different groupings to generate content fragments 18 that meet the requirements of the target streaming technology. Thus, a downstream device (e.g., a fragmentor/encapsulator) can align different vendor streams belonging to same identifiable group, thereby maximizing interoperability between various transcoders and fragmentors in a system, allowing fragment sizes of different durations to be made from a single data stream.

In an aspect, the encoder 14 can be configured for encoding the data stream with a Coordinated Universal Time (CUT) or Universal Time Coordinated (UTC) stamp 28 indicative of a time the encoder 14 conditions the data stream. As an example, the time stamp 28 can be indicative of a time the boundary flag is encoded in the data stream. In an aspect, CUT/UTC is a time standard based upon the international atomic clock and can be relied upon by various computer networks, the Internet, and in aviation to coordinate time between systems across the world. Other standard time system and universal time systems can be used.

In an aspect, the encoder 14 can encode the above-described information in a data field (e.g., private field, header, metadata, and the like) associated with the data stream. By way of example, information bits can be placed in a private data field (e.g., AU_Information, PVR assist field, private filed, and the like) of an adaptation field of the MPEG transport stream. (See SCTE128, international standard ISO/IEC 13818-1, and DVB 101-154, each of which is hereby incorporated herein by reference in its entirety.) The use of a field such as the adaptation field can be beneficial to system performance because the information bits can be part of a video packet and precede the video data, where it is not necessary to look further into the video data to discover the encoded information. As an example, the random_access_indicator field in a conventional MPEG-2 adaptation_field typically indicates that the current data packet contains some information to aid random access. Accordingly, the access indicator field can be used by the encoder 14 to indicate that information relating to at least the identification and marking of content fragments 18 can be included in the data stream. However, the information can be encoded in any data structure associated with the content such that a device receiving the content will also receive the information and will be able to use the information to analyze, parse, and/or fragment the content. By way of example, the MPEG-4 standard includes a supplemental enhancement information (SEI) level that would provide space for encoding the information bits into the stream. In particular, an SEI message can be created and placed at every location within the stream. However, as technology and standards develop, the information can be inserted by the encoder 14 into other fields, headers, and the like, or can be placed in separate files associated with the content.

In an aspect, the data stream can be encoded with a plurality of bits (e.g., four) that are subsequently accessible by downstream devices such as the fragmentor 16 when parsing the data stream. For example, a grouping bit flag can be inserted into the data stream to indicate that a particular content (e.g., picture) belongs in a group. As a further example, a plurality of bits can be inserted in the data stream as a bit group to indicate the particular content belongs to one or more groups. For example, three bits allows an indication of all combinations of three groups: 1&2&3,1&2, 1&3,2&3. Accordingly, when using three bits, the particular picture can belong in up to three groups. As a further example, a spacing bit flag can be inserted into the data stream to indicate whether certain content represented by the data stream and belonging to the same group are evenly spaced. Other means of inserting information can be used.

In the conventional MPEG-2 transport stream format, the presence of an adaptation field can be indicated by means of the adaptation_field_control field, i.e. a 2-bit field in the header of the data stream. The adaptation field itself may contain a private_data_bytes field including private data, messages, and/or retrievable information not coded in a particular standard. The presence of private data bytes can be signaled by means of the transport_private_data_flag coded at a beginning of the adaptation field. If private data bytes exist, the total number of private data bytes can be specified by means of the transport_private_data_length, an 8-bit field that can be directly followed by the private data bytes. The private data bytes may be composed of one or more data fields where the encoder boundary data field can be one of these fields.

As described in more detail below, a data stream can comprise a plurality of content fragments. As an example, each of the fragments can comprise a plurality of frames of content. As a further example, the content fragments can be grouped together to form a larger content stream.

Figure 2A:
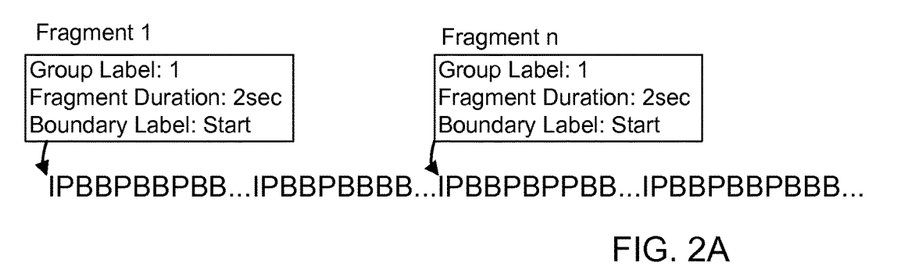
FIGS. 2A-2C are block diagrams representing frames of exemplary conditioned data streams.
Figure 2B:
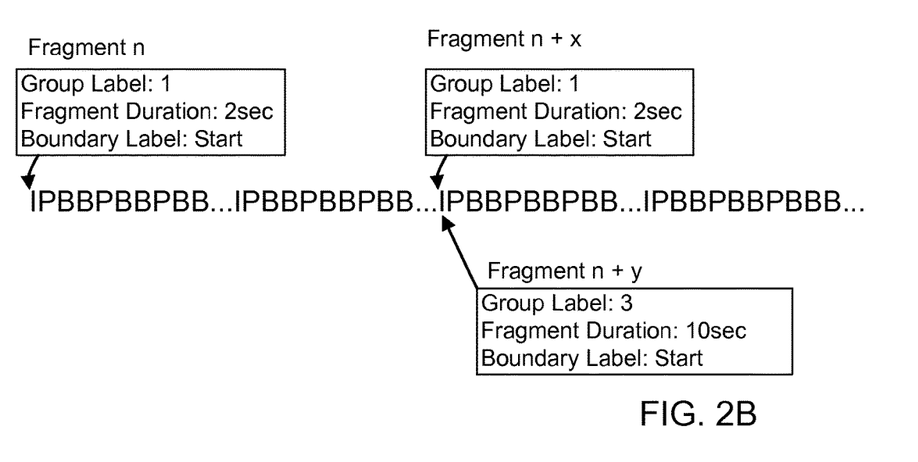
Figure 2C:
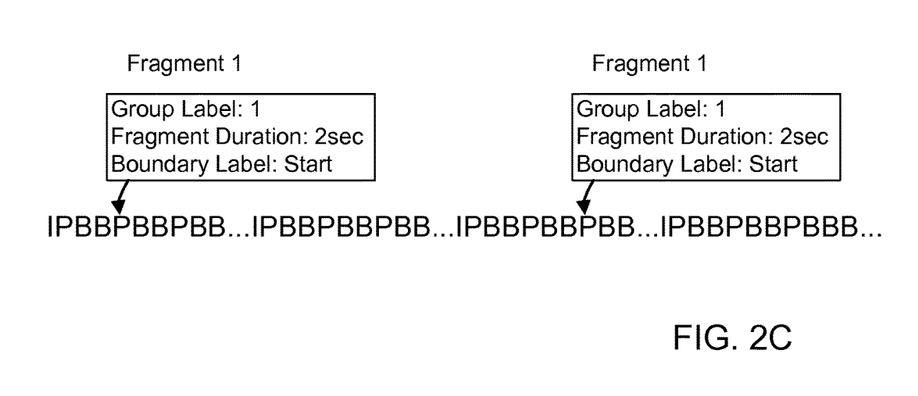

As an example, FIG. 2A illustrates a plurality of frames representing an exemplary conditioned data stream. Referring to FIGS. 2A, 2B, and 2C, for illustrative purposes only, the data stream can be represented by a series of letters (I, P, and B), each of which signifies a frame in an exemplary data stream. As shown in FIGS. 2A, 2B, and 2C, the I represents an IDR-frame, the P represents a P-frame, and the B represents a B-frame. The sequence of frames shown is intended only to be a representative example of a data stream, and is in no way limiting on the type or sequence of frames that the system 10 can process. In addition, FIGS. 2A, 2B, and 2C each have one or more boxes representing fragment boundaries and associated information. As seen in the figures, each fragment identifies a frame with which it is associated for the purposes of the example shown.

Referring again to FIG. 2A, a first data entry can be inserted in a first IDR frame representing a Fragment 1. The first data entry can comprise an identification of grouping characteristics 26 (Group 1), the fragment's duration 22 (two seconds), and an identification of the start boundary 20 of Fragment 1. A second data entry can be inserted in a second IDR frame representing a Fragment n. The second data entry can comprise an identification of grouping characteristics 26 (Group 1), the fragment's duration 22 (two seconds), and an identification of the start boundary 20 of Fragment n. Similarly, other frames can be encoded with entries to indicate at least one of a grouping information, the start boundary 20, the fragment's duration 22, and end boundary 24 of a particular content fragment 18. Any number of content fragments 18 can be labeled and identified in the data stream. Accordingly, a downstream device such as the fragmentor 16 can receive the conditioned data stream and construct the appropriate content fragments 18 for distribution to an end user. The downstream device is not limited to a single GOP structure for the construction of each of the content fragments 18 from the conditioned data stream.

FIG. 2B illustrates a plurality of frames representing another exemplary conditioned data stream. By way of example only, the data stream shown in FIG. 2B has been conditioned such that it can be processed for two types of streaming technologies: one that requires two-second fragments, and a second that requires ten-second fragments. As shown in FIG. 2B, for illustrative purposes only, a first data entry can be inserted in a first IDR frame representing a Fragment n. The first data entry can comprise an identification of grouping characteristics 26 (Group 1), the fragment's duration 22 (two seconds), and an identification as the start boundary 20 of Fragment 1. A second data entry can be inserted in a second IDR frame representing a Fragment n+x (representing a number of two second fragments). The second data entry can comprise an identification of grouping characteristics 26 (Group 1), the fragment's duration 22 (two seconds), and an identification of the start boundary 20 of Fragment n+x. A third data entry can be inserted in the second IDR frame representing a Fragment n+y (representing a number of ten second fragments). The third data entry can comprise an identification of grouping characteristics 26 (Group 3), the fragment's duration 22 (ten seconds), and an identification of the start boundary 20 of Fragment n+y. In an aspect, a single conditioned data stream can include grouping information for various types of programming and streaming technologies. Accordingly, various downstream devices having different requirements for stream processing can receive the conditioned data stream and construct the appropriate content fragments 18 for distribution to an end user such that the fragments will be compatible with the underlying streaming technology. As an example, one device can extract frames labeled with Group 1 while another device can extract the frames labeled with Group 3, all from the same conditioned data stream.

As a further example, FIG. 2C illustrates a plurality of frames representing another exemplary conditioned data stream, wherein a fragment boundary is encoded independent of a GOP structure of the data stream. As shown in FIG. 2C, as an illustrative example only, a first data entry can be inserted in a first non-IDR frame representing a Fragment 1. The first data entry can comprise an identification of grouping characteristics 26 (Group 1), the fragment's duration 22 (two seconds), and an identification of the start boundary 20 of Fragment 1. A second data entry can be inserted in a second non-IDR frame representing a Fragment n. The second data entry can comprise an identification of grouping characteristics 26 (Group 1), the fragment's duration 22 (two seconds), and an identification of the start boundary 20 of Fragment n. Similarly, other frames (both IDR-frames and non-IDR frames) can be encoded with entries to indicate at least one of a grouping information, the start boundary 20, the fragment's duration 22, and end boundary 24 of a particular content fragment 18. Any number of content fragments 18 can be labeled and identified in the data stream. Since the downstream device is not limited to a single GOP structure for the construction of each of the content fragments 18, the insertion of data entries and boundaries into non-IDR frames can be subsequently processed by the downstream device to construct the appropriate content fragments 18 for distribution to an end user.

Figure 3:
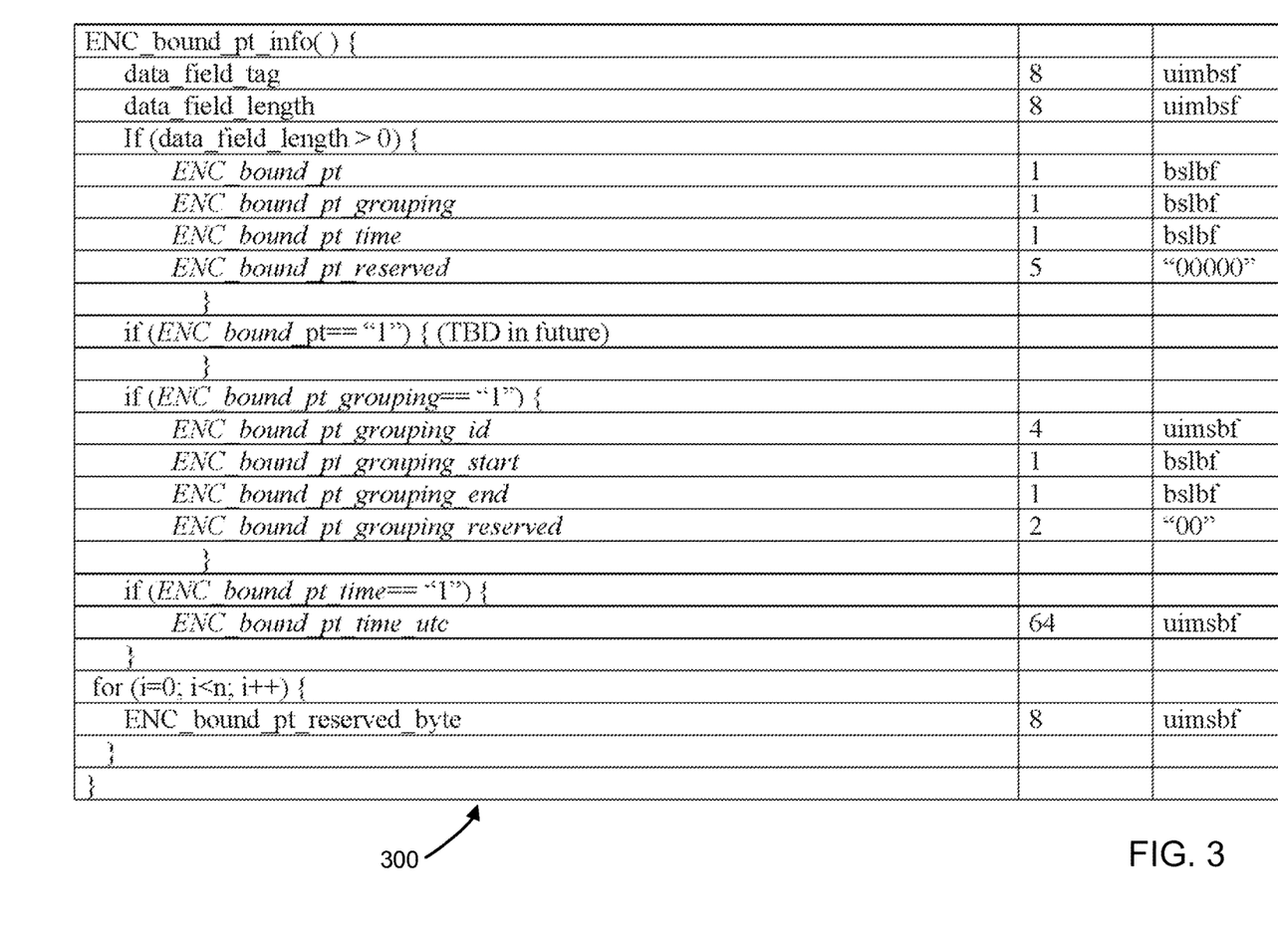
FIG. 3 is a chart of an exemplary data field entry inserted into a data stream.

Turning now to FIG. 3, an exemplary data field entry inserted into a data stream is shown for illustrative purposes only. In an aspect, the private data field of the adaptation field can be used to encode information onto the data stream as a code field similar to a field 300. The data field entry can be parsed from the data stream by downstream devices, such as fragmentors. The data field can also be ignored by downstream devices. Accordingly, downstream devices can still operate on the data stream even if not configured to take advantage of the data field entry. This allows the fragmentation system 10 to be compatible with legacy equipment.

Referring to FIG. 3, the "uimsbf" entry can be an unsigned integer wherein its most significant bit can be translated first, while the "bslbf" entry can be a bit string wherein the leftmost bit can be translated first. The data_field_tag entry can be an 8-bit field that identifies the type of each data field. The data_field_length entry can be an 8-bit field specifying the total number of bytes of the data portion of the data field following the byte defining the value of this field. The ENC_bound_pt entry can be a bit flag that indicates a boundary (e.g., start boundary 20, end boundary 24, or the like). The ENC_bound_pt_grouping entry can be a bit flag that indicates whether the boundary needs to indicate grouping information, wherein a group can indicate a continuous set of frames which can be independent of the GOP structure. By way of example, a default value for the ENC_bound_pt_grouping entry can be "0" unless grouping information needs to be included. The ENC_bound_pt_time entry can be a bit flag to indicate if UTC timing for the creation of a boundary point is provided. The ENC_bound_pt_grouping_id entry includes 4 bits to indicate a group number or a group pattern. The ENC_bound_pt_grouping_start entry can be a bit flag to indicate the start boundary 20 of a group. The ENC_bound_pt_grouping_end entry can be a bit flag to indicate the end boundary 24 of a group. The ENC_bound_pt_time_utc entry includes a 64 bit unsigned integer to indicate the UTC time when the encoder 14 conditioned the data stream (e.g., created a particular boundary point). The data structure 300 and the associated data entry labels are merely exemplary of the kinds of data that may be used by the system 10 in implementing an exemplary embodiment, and that a wide variety of types of data can be stored in various formats and structures without departing from the scope of the present disclosure.

In an aspect, fragment boundary in an audio packet can also be indicated through methods similar to those described herein. For example, a packetized elementary stream (PES)

can contain multiple audio packets. An data entry such as "ENC_bound_pt" can be used to indicate the PES packet that contains the fragment boundary. A data entry such as "enc_bound_pt_grouping_id (0-15)" can be used to indicate which of the plurality of audio frame in the PES packet starts at the fragment boundary. Other data entries and structure can be used to apply the methods to various content streams.

As described in more detail below, a system for processing a data stream can comprise a fragmentor to separate a data stream into fragments of the data for downstream processing of the content.

Referring again to FIG. 1A, the fragmentor 16 can be in signal communication with the encoder 14 to receive the data stream therefrom. In an aspect, the fragmentor 16 conditions the data stream for downstream distribution by a computing device such as server 30 through a content distribution network 32 to user devices 34 or consumer devices. In an aspect, the server 30 can be an origin server (e.g., Hypertext Transfer Protocol (HTTP)). However, other computing devices and servers an be used. As an example, the fragmentor 16 can communicate with the server 30 using the POST method of the Hypertext Transfer Protocol (HTTP). However, other protocols and communication methods can be used. In an aspect, provider-supplied and/or user-supplied devices can be disposed downstream of the content distribution network 32 and upstream one or more user device 34. As an example the provider-supplied and/or user-supplied devices can be configured to process the fragments such as de-fragmenting. Other devices and configurations can be used.

In an aspect, the fragmentor 16 can separate or fragment the data stream into each of the content fragments 18 represented by the data stream based upon an information encoded onto the data stream by the encoder 14. As an example, the fragmentor 16 can access the information encoded/inserted in the data stream by the encoder 14 to define the content fragments 18 based on, among other things, boundaries, grouping, timing, and duration from the encoded data stream 13. Once the content fragments 18 are generated, the content fragments 18 can be transmitted to the content distribution network (CDN) 32 for delivery to the user devices 34 or client for playback. As an example, the server 30, CDN 32, and the user device 34 can intercommunicate using the GET method of the HTTP. However, other protocols and communication methods can be used.

As described in more detail below, a method for processing a data stream can comprise encoding information relating to each of a plurality of content fragments of the data stream for downstream processing of the content stream.

Figure 4:
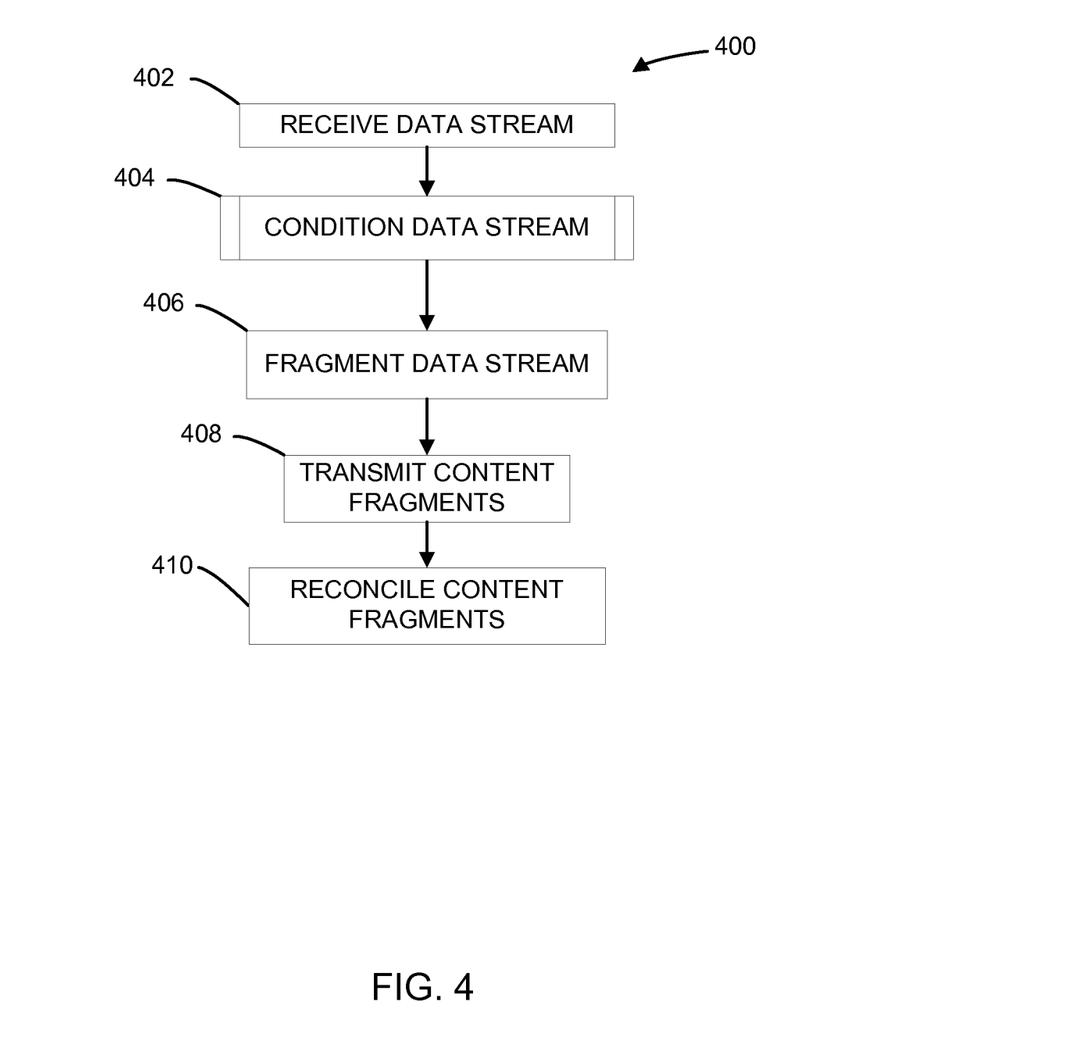
FIG. 4 is a flow chart of an exemplary method for conditioning a data stream.

FIG. 4 illustrates an exemplary method 400 of data stream fragmentation. FIG. 4 will be discussed, for illustrative purposes only, with reference to FIG. 1 and FIG. 2. In step 402, the input 12 can receive the data stream from the data source 17 and can deliver the data stream to the encoder 14 for processing/conditioning. In step 404, the encoder 14 can encode/transcode information onto the data stream relating to the content fragments 18 represented by the data stream. The process of encoding/transcoding the data stream will be discussed in greater detail below with respect to FIG. 5. In step 406, the encoded data stream can be received by the fragmentor 16 to fragment the data stream in accordance with the encoded information and to define the content fragments 18 represented thereby. Once the content fragments 18 are generated, the content fragments 18 can be distributed to a client (e.g., end-user or consumer), as shown in step 408. For example, the content fragments 18 can be stored in a server 30 where they can then be accessed by the user device 34 (e.g., via a user interface). In step 410, the user device 34 can receive the content fragments 18 and adaptively select the most appropriate sequence of the content fragments 18 to reconcile the content fragments as a substantially seamless media playback.

Figure 5:
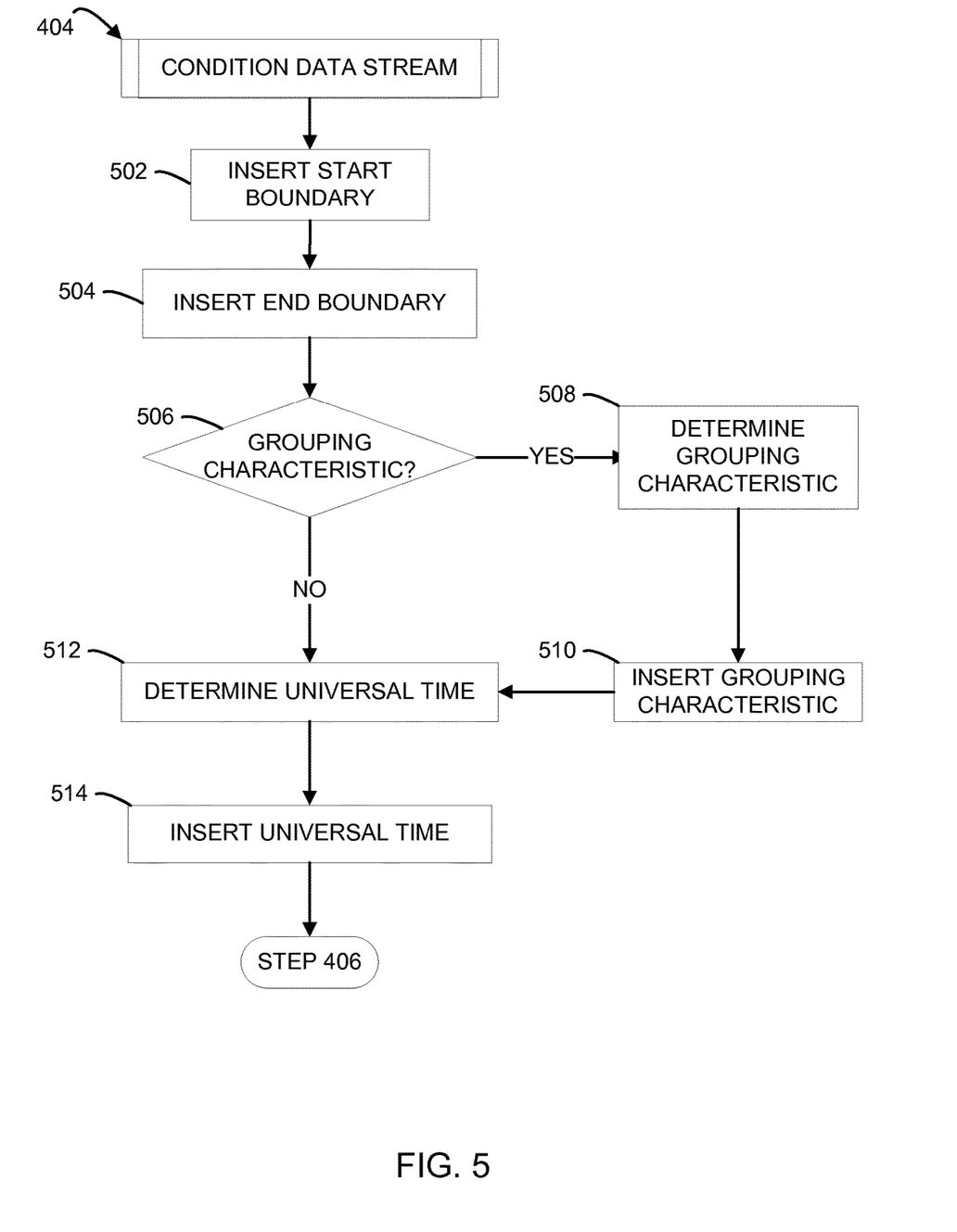
FIG. 5 is a flow chart of an exemplary method for conditioning a data stream.

FIG. 5 illustrates a subroutine 404 of the method 400. FIG. 5 will be discussed with reference to FIG. 1, FIG. 2, and FIG. 4. In particular, the step 404 of FIG. 4 can be executed in a manner similar to routine 404, as discussed below. In step 502, a boundary flag can be inserted into the data stream to represent that the start boundary 20 of one of the content fragments 18. Although a single boundary point can be used, in certain exemplary aspects, in step 504, a boundary flag can be inserted into the data stream to indicate an end of a content fragment 18. In step 506, it can be determined whether a grouping characteristic 26 should be inserted into one or more of the frames in the data stream. In an aspect, the encoder 14 can receive transcoding information relating to a programming parameter. For example, a signal can be transmitted to the encoder 14 identifying a particular streaming technology such as Microsoft IIS Smooth Streaming, Adobe Flash Dynamic Streaming, and Apple HTTP Adaptive Bitrate Streaming. Accordingly, the encoder 14 can define grouping characteristics 26 to match the appropriate program. As a further example, the data stream transmitted to the encoder 14 can include information relating to programming parameters that can be received by the encoder 14 to affect a determination of whether grouping characteristics 26 should be included in the conditioned data stream.

If it is determined that a grouping flag is to be used, then the "YES" branch can be followed to step 508. In step 508, a grouping information for the content (e.g., picture) in the data stream can be determined. By way of example, the grouping information can include a group number, a group identification, a group pattern, a start boundary of a particular group, an end boundary of a particular group, and other grouping and sub-grouping information. In step 510, the grouping information can be inserted into the data stream to identify the particular content. The method 404 then proceeds to step 512. Referring again to decision step 506, if the determination as to whether a grouping characteristic is negative, then the "NO" branch can be followed to step 512.

In step 512, a universal time can be determined. In an aspect, a coordinated universal time (UTC) can be determined by the encoder 14 or a clock-enabled device in communication with the encoder 14. As an example, the universal time can be transmitted to the encoder 14 from a remote source. In step 514, the universal time can be inserted into the data stream to represent a time the data stream was encoded (e.g., the time the boundary flag can be inserted into the data stream).

The disclosure of exemplary aspects herein provides a means to indicate characteristics of the content fragments 18 represented by the data stream independent of a GOP structure. For example, boundary and grouping characteristics can be identified in a header of the data stream. This allows a downstream device to process the video and or audio stream according to knowledge of the characteristics of each of the content fragments represented by the data stream. In an aspect, the fragmentor 16 or other downstream device is not required to access the elementary stream in order to access the encoded characteristics of the content fragments 18, such as boundary, time duration, and grouping information. Accordingly, the processing load on downstream devices is minimized, thereby maximizing the density of signals being processed.

The present system and methods also allow for indicating that a frame or group of frames can belong to more than one group, thereby allowing a downstream device (e.g., a fragmentor/encapsulator) to fragment video transport streams that may belong to a different vendor and align different vendor streams belonging to same multiple bit rate (MBR) group. Accordingly, the relationship between the GOP structure and the fragment no longer necessarily drives the creation of video, and allows for multiple IDR frames to be placed in the fragment. This, in turn, can allow for better quality through more adaptive GOP structures that can improve picture quality for quick scene changes and motion. Also, fragment sizes of different durations can be made from the data stream.

The ability to indicate a fragment boundary allows for the encoder/transcoder and fragmentor operations to be in different devices, thereby allowing different vendors to be considered based upon cost or expertise for providing such devices. The ability to indicate a fragment boundary maximizes ease of interoperability between multiple vendors. Separate devices for transcoding and fragmenting allow for transcoding to be reused in other places when it is still in a transport stream format. Reuse of streams can reduce the cost for various services that encode the same content. Since multiple GOP structures can be used within a particular content fragment, a single common transport stream signal can be used for various adaptive streaming fragmentation processes.

The system for data stream fragmentation with scalability provides several advantages over conventional encoding/fragmenting systems in addition to allowing the use of multiple distributed fragmentors. For example, the system offers the ability to accelerate the parsing of a stream by using multiple fragmentors. It also allows for a common stream with common signaling information that can be used by multiple different streaming technologies. The system also allows the synchronization of playback of a stream among two or more clients, in that the clients can communicate with one another to cause each to play identically-named fragments at the same time.

It will be apparent to those skilled in the art that various modifications and variations can be made without departing from the scope or spirit of the present disclosure. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, implemented by one or more computing devices, comprising:
    receiving a data stream comprising content, wherein the data stream comprises a group of pictures structure, the group of pictures structure comprising a plurality of groups of pictures each comprising a respective plurality of successive frames, each of the plurality of groups of pictures defined by a respective boundary;
    identifying two or more grouping characteristics associated with the data stream;
    determining two or more expected durations based on the two or more identified grouping characteristics;
    determining a first boundary of a first content fragment based on a first of the two or more expected durations, wherein the first boundary is independent of the respective boundary of each of the plurality of groups of pictures;
    determining a second boundary of a second content fragment based on a second of the two or more expected durations, wherein the second boundary is independent of the respective boundary of each of the plurality of groups of pictures;
    encoding, into the data stream, information representing the first boundary of the first content fragment and wherein a request for content associated with the first of the two or more expected durations returns the first content fragment; and
    encoding, into the data stream, information representing the second boundary of the second content fragment and wherein a request for content associated with the second of the two or more expected durations returns the second content fragment.

2. The method according to claim 1, wherein the information further comprises a group flag indicative of an existence of the two or more grouping characteristics.

3. The method according to claim 2, wherein the group flag indicates at least one of a beginning of a program or an end of a program.

4. The method according to claim 2, wherein the group flag indicates a streaming technology to use for processing any content fragments associated with the group flag.

5. The method according to claim 2, wherein the group flag indicates at least one of the start boundary and the end boundary of an associated group of content fragments.

6. The method according to claim 1, wherein the data stream is a transport stream and the information is encoded in a transport header of the transport stream.

7. The method according to claim 6, wherein the information is encoded in an adaptation field of the transport header of the transport stream.

8. The method according to claim 1, wherein the information is encoded in a private data field of the data stream.

9. The method according to claim 1, further comprising encoding a universal time stamp in the data stream, the universal time stamp indicative of a time the information is encoded in the data stream.

10. The method according to claim 1, further comprising encoding an identification of the grouping characteristics into the content fragment, wherein the identification of the grouping characteristics allows a downstream device to retrieve the content fragment based upon the identification of the grouping characteristics.

11. A method, implemented by one or more computing devices, comprising:
    receiving a data stream comprising a content fragment, wherein the data stream comprises a group of pictures structure, the group of pictures structure comprising a plurality of groups of pictures each comprising a respective plurality of successive frames, each of the plurality of groups of pictures defined by a respective boundary;
    identifying one or more grouping characteristics associated with the content fragment;
    determining one or more expected durations based on the one or more identified grouping characteristics;
    encoding a first boundary flag in the data stream, the first boundary flag indicative of a boundary of the content fragment, and wherein the boundary of the content fragment is based on the one or more expected durations;
    encoding a universal time stamp in the data stream, the universal time stamp indicative of a time the first boundary flag is encoded in the data stream; and encoding a second boundary flag in the data stream, the second boundary flag indicative of a program end boundary, wherein the first boundary flag and the second boundary flag are independent of the respective boundary of each of the plurality of groups of pictures.

12. The method according to claim 11, wherein the data stream is a transport stream and the boundary flag is encoded in a transport header of the transport stream.

13. The method according to claim 12, wherein the boundary flag is encoded in an adaptation field of the transport header of the transport stream.

14. The method according to claim 12, wherein the content fragment comprises a plurality of intra coded picture frames.

15. The method according to claim 11, further comprising encoding an identification of the grouping characteristics into the content fragment, wherein the identification of the grouping characteristics allows a downstream device to retrieve the content fragment based upon the identification of the grouping characteristics.

16. A system comprising:
an encoding device configured to:
receive a data stream comprising a group of pictures structure, the group of pictures structure comprising a plurality of groups of pictures each comprising a respective plurality of successive frames, each of the plurality of groups of pictures defined by a respective boundary;
encode, into the data stream, information representing a first boundary of a content fragment, wherein the data stream is associated with one or more grouping characteristics, wherein one or more expected durations is based on the one or more grouping characteristics, wherein the first boundary is independent of the group of pictures structure of the data stream, and wherein the first boundary is based on the one or more expected durations;
encode, into the data stream, information representing a second boundary, wherein the second boundary represents a program end boundary; and
a fragmenting device, in signal communication with the encoding device, configured to:
receive the data stream from the encoding device; and
construct the content fragment based upon the information representing the first boundary of the content fragment and the second boundary.

17. The system according to claim 16, wherein the information further comprises a group flag indicative of an existence of the grouping characteristic of the content fragment.

18. The system according to claim 17, wherein the group flag indicates the streaming technology to use for processing any content fragments associated with the group flag.

19. The system according to claim 16, wherein the encoding device is further configured to encode a universal time stamp in the data stream, the universal time stamp indicative of a time the information is encoded in the data stream.

20. The system according to claim 16, wherein the encoding device is further configured to encode the grouping characteristics into the content fragment, wherein the grouping characteristics allow a downstream device to retrieve the content fragment based upon the grouping characteristics.

* * * * *